United States Patent [19]

Gregory

[11] 4,443,953

[45] Apr. 24, 1984

[54] HANDLE FOR A DRAFTING INSTRUMENT

[76] Inventor: Stephen E. Gregory, 3217 Celanese Rd., Rock Hill, S.C. 29730

[21] Appl. No.: 381,936

[22] Filed: May 26, 1982

[51] Int. Cl.[3] .......... G01B 3/00

[52] U.S. Cl. .......... 33/403; 33/474; 33/484; 2/121

[58] Field of Search .......... 33/482, 484, 474, 477, 33/488, 467, 403, 1 N, 41 B; 16/2, 108, 114 R, 121, 127; 74/553, 543, 557

[56] References Cited

U.S. PATENT DOCUMENTS

| | | | |
|---|---|---|---|
| 699,738 | 5/1902 | Zange | 33/482 |
| 1,383,759 | 7/1921 | Romie | 33/41 B |
| 2,080,620 | 5/1937 | Martin | 33/474 |
| 2,364,529 | 12/1944 | Hill | 33/474 |
| 2,518,851 | 8/1950 | Anderson | 16/2 |
| 2,593,914 | 4/1952 | Palitto | 33/482 |
| 2,602,228 | 7/1952 | Webber | 33/1 N |
| 3,016,562 | 1/1962 | Reid | 16/2 |
| 3,380,208 | 4/1968 | Cook | 16/108 X |

*Primary Examiner*—William D. Martin, Jr.
*Attorney, Agent, or Firm*—John W. Huckert

[57] ABSTRACT

A handle for a drafting instrument and the like comprising a ring body structure having a traverse slot therethrough for permitting the ring to be compressed, and further provided with a groove or ridge structure for complementary engagement with the perimeter of a hole and double aperture of a drafting instrument with which the handle is used. The preferred embodiment has one ridge which is closest to the gripping surface of a handle of larger diameter than a contact ridge furthermost from the gripping surface for permitting easy indexing of the handle during installation with the drafting instrument. Another embodiment reverses the respective diameters of the two ridges, while a further embodiment employs an internal spring for increasing the outward tension of the ring when released, and a further embodiment wherein tongue and groove structure is complementarily provided between the drafting instrument and the engaging portion of the handle ring.

19 Claims, 8 Drawing Figures

HANDLE FOR A DRAFTING INSTRUMENT

BACKGROUND OF INVENTION

1. Field of the Invention

This invention relates generally to a handle for holding and manipulating drafting instruments such as triangles, templates, and the like.

2. Description of the Prior Art

A common problem with known handles of conventional type is that they do not provide a proper grip without interfering with the normal use of the drafting instrument.

There have been devices devised to hold drafting instruments, but oftentimes these still are far from effective. Similarly, known structures for holding drafting instruments are difficult to grip, expensive to manufacture, and in general leave much to be desired.

Existing prior patents which may be pertient to this invention are as follows:

| | | |
|---|---|---|
| R. B. Ware | 1,145,531 | July 6, 1915 |
| J. R. Hageman | 3,061,933 | Nov. 6, 1962 |
| S. S. Coe | 4,194,293 | Mar. 25, 1980 |

These patents differ from the present invention as follows: The handle by Ware does not provide for a proper grip because it cannot be grasped with equal ease from all angles. It is not suited to the usual drafting environment because when the triangle is slid across the surface of a drawing, eraser residue can rapidly collect in the open slot and spring, thus impairing the operation of the handle. The handle would likely be costly to produce because it uses several moving parts requiring close dimensional tolerances and factory assembly. The triangle also requires special machining for the handle to function in the desired manner.

The handle by Hageman also does not provide the proper grip because it cannot be grasped with equal ease from all angles. Furthermore, it is not attached to the triangle with sufficient firmness and the resultant side-to-side wobble would reduce its usefulness as a handle. The durability of the handle is questionable, since the very small contact area of the bearing surfaces 25 and 16 would be subject to rapid wear and breakage. Obviously, the triangle requires special machining.

The lettering triangle of Coe does not specifically address the problem of handling triangles. Although the triangle is equipped with a knob assembly 30, neither the knob assembly nor the triangle appear to be reversible. The durability of the knob assembly is questionable due to the small contact area of the hole 15 and the threaded post 16. Of course, the triangle requires special machining.

Although certain features of the referenced inventions are similar to the present invention, none of the cited devices meets all of the requirements for a good handle for a drafting instrument in the manner of the present invention.

SUMMARY OF THE INVENTION

An object of the present invention is to provide a handle having a proper grip which is also easily manipulated when attached to a drafting instrument such as a triangle.

Another object of the present invention is to provide an easily installed handle for use with various types of drafting instruments which is easy to attach thereto, and does not interfere with the normal use of the instrument.

A further object of this invention is to provide an easily grippable handle device which can be easily manipulated and which introduces a minimum of visual obstruction, and a handle which does not project below the instrument when attached thereto.

A still further important object of the present invention is to provide a handle which is flexible in that it can be used with either side of a drafting instrument, and which can be quickly and easily removed and replaced.

Another object of the present invention is to provide a handle having as large an area as possible of the load bearing contact between the handle and a drafting instrument in order to minimize wear and stress on the instrument.

The present invention has a number of new and novel features which make it a valuable contribution to the present state of the art.

Requirements for a good handle are as follows: triangles, templates, and similar drafting implements are thin and difficult to manipulate. The need for a good, easily manipulated handle is obvious, but to the inventor's knowledge, a suitable handle has not yet appeared on the market. A good handle should provide the proper grip without interfering with the normal use of the triangle or other drafting instrument. The handle should be durable and suited to the drafting environment. In order to be marketed successfully, the handle should be appealing and low in cost. These requirements have been addressed by previous inventions, but without total success.

The handle should provide for a proper grip; that is, the handle should be generally rounded in shape so that it may be grasped between the thumb and fingers of either hand with equal ease, regardless of the angular position of the handle relative to the hand. Also, the handle should feel comfortable and should be firmly attachable to the drafting instrument.

In addition, the handle should not interfere with the normal use of the drafting instrument; that is, the handle should introduce a minimum of visual obstruction. Also, the handle should not project below the lower surface of the triangle or other drafting instrument. Such projections could mar the drawing itself. Since a triangle, for instance, is likely to be applied over the drawing with either side facing up, the handle should not prevent the triangle from being inverted and used with either side facing up. Therefore, the handle should be easily removable and replaceable.

The handle itself should be durable, but to minimize wear and stress on the drafting instruments, the handle should present as large an area as possible at the load-bearing contact surface between the handle and the instrument. Triangles and the like are generally constructed of thin plastic which is not capable of resisting large stresses.

The handle should be suited to the drafting environment; that is, the handle should not have recesses in which eraser residue could collect and prevent proper operation of the handle.

The handle should be appealing; that is, the design of the handle should be simple and straightforward and in concert with its simple function. A simple geometric shape is very desirable, as it thus will harmonize with the simple geometric shapes of a triangle and other drafting implements.

The handle should be low in cost; that is, the handle should be designed with automated production machinery in mind. Its design should use a minimum number of parts. The handle should not involve tight dimensional tolerances. In order that a triangle may be sold for use eitherwith or without the handle, it is desirable that the handle not require any machining or forming of the triangle itself, beyond that normally applied to triangles. This concept is also valid for other types of drafting instruments.

The foregoing features and advantages are present in the handle device of the present invention.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 4:
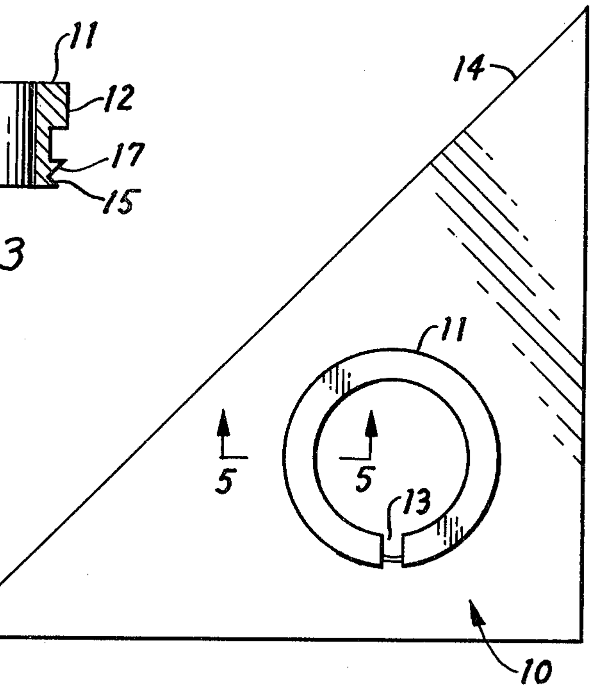
FIG. 4 is a top plan view of the handle in combination with a drafting instrument.

Referring to FIG. 4 of the drawings, reference numeral 10 indicates in general the new and novel handle of the present invention. This device is shown as being attached to a triangle type of drafting instrument.

Figure 1:
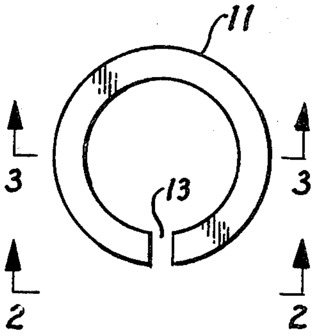
FIG. 1 is a top plan view of a handle of the present invention.
Figure 3:
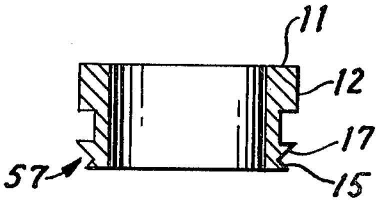
FIG. 3 is an elevational view, in cross-section, along lines 3—3 of FIG. 1.
Figure 2:
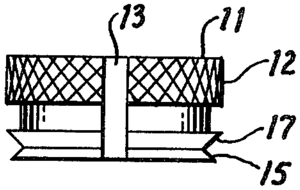
FIG. 2 is a side elevational view looking along lines 2—2 of FIG. 1.

The specific details of the handle can best be appreciated by looking at FIGS. 1, 2 and 3 of the drawings. A partial ring 11 having a V-shaped groove 57 therein provides the basic body structure of the handle 10. The handle 10 is also provided with a knurled gripping surface 12. A slot 13 in the ring 11 permits the handle 10 to be compressed for installation or removal from a drafting instrument, such as the triangular template 14 shown in FIG. 4. A thin, ridged contact area 15 of the groove 57 securely engages a recessed or bevelled inner edge 16 of an opening in the triangular template 14 after the compressed handle 10 is inserted therein and then allowed to expand. The upper contact ridge 17 of the groove 57 is slightly larger in diameter than lower contact ridge 15 for facilitating proper indexing of the handle 10 relative to the triangular template 14 when installing the handle.

Figure 5:
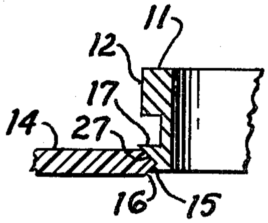
FIG. 5 is a fragmentary portion, in cross-section, taken along lines 5—5 of FIG. 4.

As best seen in FIG. 5, after the ring 11 of the handle 10 has been compressed and inserted into the triangle 14, and then allowed to expand, the smaller diameter ridge 15 engages with the lower bevelled surfaces 16 of the opening in the triangle while the larger diameter of the ridge 17 engages with the upper bevel 27 of the opening. Thus, during installation, the larger diameter ridge 17 will help to orientate and center the handle within the opening of the drafting instrument.

Figure 6:
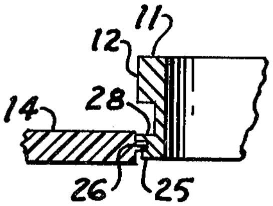
FIG. 6 is a view like FIG. 5 of a modified embodiment.

FIG. 6 shows a modified embodiment wherein the bevels 16 and 27 of the opening in the drafting instrument are replaced by a flange 26 which extends inwardly around the entire circumference of the opening. The ridge 15 on the ring 11 has been changed to a flange 25 of smaller diameter than the upper flange 28 which replaces the ridge 17 of the preferred embodiment. Thus a complementary modified tongue and groove structure, as seen in cross-section in FIG. 6, is formed in this embodiment.

Figure 7:
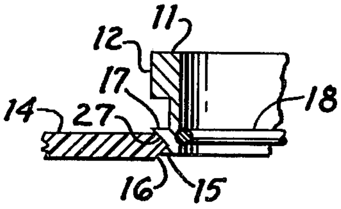
FIG. 7 is a view like FIG. 5 of a another modified embodiment.

In the embodiment of FIG. 7, the structure of the handle 10 and the V-shaped groove 57 is the same as that of the preferred embodiment of FIGS. 1–5, but in this embodiment a spring 18 provides a supplementary source of outward pressure to insure firm engagement when low tensile material, such as plastic, is used for ring 11.

The preferred embodiment of FIGS. 1–5 is formed from a circular metal turning with a punched or milled slot 13, as shown. However, other materials and fabrication processes may be used, such as: injection-molded plastic (not necessarily of circular shape), rolled and formed sheet metal, cast metal, or the like.

Figure 8:
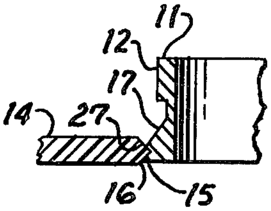
FIG. 8 is a view like FIG. 5 of a still another modified embodiment.

A final embodiment is shown in FIG. 8. In this embodiment the lower contact ridge 15 has a larger diameter than the upper contact ridge 17 so that the device may be inserted and attached from the bottom of the drafting instrument rather than the top thereof. With this modification only, the rest of the structure is like that of the preferred embodiment of FIGS. 1–5.

Thus, the present invention comprises a handle for a triangle, template, or other thin drafting implement. The handle has a novel method of attachment to the triangle which results in several important advantages: (a) The bottom surface of the triangle remains unobstructed (i.e., there are no protruding rivets or clips). (b) The outward spring pressure of the handle provides a firm friction grip, preventing any looseness or rotational movement of the handle relative to the triangle. (c). The handle may be removed and reinstalled quickly and without tools by squeezing it between the thumb and forefinger, thereby compressing and disengaging the grooved joint. (d) The shape of the interlocking tongue and groove mating surfaces may be made symmetrical about the plane at the center of thickness of the triangle, permitting the handle to be attached to either side of the triangle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A drafting instrument with a handle comprising a partial ring which may be compressed and inserted into a mating hole in the drafting instrument; said ring including mating means for frictionally engaging said drafting instrument without projecting below the bottom surface of the drafting instrument and which when the compressed ring is released expands to firmly engage the periphery of the mating hole, the mating means then providing secure attachment of the handle to the drafting instrument without interfering with the slidability of the drafting instrument, and the part of the ring exposed above the surface of the drafting instrument thus providing a handle for the easy manipulation of the drafting instrument.

2. A drafting instrument with a handle as set forth in claim 1, wherein said partial ring is formed from a complete ring by having a section removed therefrom to provide a traverse slot crosswise of the ring.

3. A drafting instrument with a handle as set forth in claim 1, wherein said part of the ring exposed above the surface of the drafting instrument for providing a handle has a knurled, grooved or roughened surface to provide a good grip for the handle for proper manipulation of the drafting instrument.

4. A drafting instrument with a handle as set forth in claim 3, wherein said partial ring is formed from a complete ring by having a section removed therefrom to provide a traverse slot crosswise of the ring.

5. A drafting device comprising a handle in combination with a planar drafting template, said handle comprising a circular double ridged ring with a transverse slot which permits the ring to be compressed and inserted into an aperture in the drafting template; one of the ridges being of slightly larger diameter than the other to act as a shoulder or stop against which the template indexes to facilitate the positioning of the ring relative to the template so that it does not project below the drafting template; which when released expands to firmly engage the periphery of the aperture, the mating ridges then providing secure attachment of the handle to the template and the part of the ring exposed above the upper surface of the template being provided with a knurled, grooved or roughened surface grip for the positive manipulation of the template.

6. The drafting device of claim 5, wherein the ridge closest to the surface grip of the handle is of a slightly larger diameter than the ridge furthest from the surface grip of the handle.

7. The drafting device of claim 5, wherein the ridge furthest from the surface grip of the handle is of a slightly larger diameter than the ridge closest to the surface grip of the handle.

8. A drafting device like claim 6 or 7, wherein an internal spring is provided on the inside of the ring for increasing the tension of the ring against the aperture in the template.

9. The drafting device of claim 5, wherein between the ridges of said double-ridged ring, is formed an inwardly directed groove and the aperture of the template is provided with an extending flange around the circumference thereof for complementary mating engagement with the groove in the ring.

10. The drafting device of claim 9, wherein an internal spring is provided on the inside of the ring for increasing the tension of the ring against the aperture in the template.

11. The drafting device of claim 5, wherein between the ridges of said double-ridged ring is formed an inwardly directed V-shaped groove and the aperture of the template is provided with an extending flange having bevelled inner edges around the circumference thereof for complementary mating engagement with the V-shaped groove in the ring.

12. The drafting device of claim 11, wherein the ridge closest to the surface grip of the handle is of slightly larger diameter than the ridge furthest from the surface grip of the handle.

13. The drafting device of claim 12, wherein an internal spring is provided on the inside of the ring for increasing the tension of the ring against the aperture in the template.

14. The drafting device of claim 11, wherein the ridge furthest from the surface grip of the handle is of slightly larger diameter than the ridge closest to the surface grip of the handle.

15. The drafting device of claim 14, wherein an internal spring is provided on the inside of the ring for increasing the tension of the ring against the aperture in the template.

16. The drafting device of claim 6, wherein between the ridges of said double-ridged ring is formed an inwardly directed V-shaped groove and the aperture of the template is provided with a V-shaped flange around the circumference thereof for complementary mating engagement with the V-shaped groove in the ring.

17. The drafting device of claim 16, wherein an internal spring is provided on the inside of the ring for increasing the tension of the ring against the aperture in the template.

18. The drafting device of claim 7, wherein between the ridges of said double-ridged ring is formed an inwardly directed V-shaped groove and the aperture of the template is provided with a V-shaped flange around the circumference thereof for complementary mating engagement with the V-shaped groove in the ring.

19. The drafting device of claim 18, wherein an internal spring is provided on the inside of the ring for increasing the tension of the ring against the aperture in the template.

* * * * *